(12) United States Patent
Lelic

(10) Patent No.: US 6,687,045 B2
(45) Date of Patent: Feb. 3, 2004

(54) VARIABLE GAIN OPTICAL AMPLIFIER AND CONTROL METHOD

(75) Inventor: Muhidin A Lelic, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 139 days.

(21) Appl. No.: 09/986,991

(22) Filed: Nov. 13, 2001

(65) Prior Publication Data

US 2002/0186460 A1 Dec. 12, 2002

Related U.S. Application Data

(63) Continuation-in-part of application No. 09/860,021, filed on May 17, 2001.

(51) Int. Cl.⁷ .............................. G02B 6/28; G02F 1/35; H01S 3/00
(52) U.S. Cl. .............................. 359/337.1; 359/337.11; 359/341.41; 359/341.42
(58) Field of Search .......................... 359/337.1, 337.11, 359/341.41, 341.42

(56) References Cited

U.S. PATENT DOCUMENTS

| | | | | |
|---|---|---|---|---|
| 5,805,759 A | * | 9/1998 | Fukushima | 385/140 |
| 5,812,710 A | * | 9/1998 | Sugaya | 385/27 |
| 5,867,300 A | * | 2/1999 | Onaka et al. | 359/283 |
| 6,108,123 A | | 8/2000 | Kinoshita | |
| 6,111,686 A | | 8/2000 | Toyohara | |
| 6,111,688 A | | 8/2000 | Kobayashi et al. | |
| 6,115,173 A | | 9/2000 | Tanaka et al. | |
| 6,118,576 A | | 9/2000 | Sugiya et al. | |
| 6,125,583 A | | 10/2000 | Murray et al. | |
| 6,172,534 B1 | | 1/2001 | Brierley | |
| 6,198,571 B1 | | 3/2001 | Yang | |
| 6,201,636 B1 | | 3/2001 | Noda | |
| 6,229,643 B1 | | 5/2001 | Nakamura | |

(List continued on next page.)

FOREIGN PATENT DOCUMENTS

| EP | 695050 | * | 1/1996 |
|---|---|---|---|
| JP | 211507 | * | 8/1997 |

OTHER PUBLICATIONS

Sergoya et al, OAA Paper FC3, Jun. 16, 1995, Novel Configuration for Low Noise . ... Systems.*
Kinoshita et al, OSA Trendism Optics and Photonic Series, vol. 25, pp 280–283, Jul. 29, 1998.*
Yan Sun, et al., "Optical Fiber Amplifiers for WDM Optical," Bell Labs Technical Journal, pp. 187–206, Jan.–Mar., 1999.

(List continued on next page.)

*Primary Examiner*—Nelson Moskowitz
(74) *Attorney, Agent, or Firm*—Nixon Peabody, LLP

(57) ABSTRACT

A variable gain optical amplifier and method for control thereof is provided that includes an amplifier stage having a light pump, and a power source for the pump, and a variable optical attenuator connected to the amplifier stage and having a movable controller that changes attenuation of the amplifier output when moved to a different position. The dynamic controller of the amplifier includes gain detecting circuits that generate signals indicative of input and output signal strengths of the amplifier stage, and a circuit that provides a signal indicative of a position of the attenuator controller, as well as a digital signal processor connected to the outputs of the gain detecting circuits and position indicating circuit. The digital process maintains a selected gain setpoint for the amplifier in accordance with a predetermined relationship between amplifier gain and the signal input and output strengths, and a position of the attenuator controller and signal attenuation. The use of a position indicating circuit in the dynamic controller obviates the need for one of the gain detecting circuits normally used in such a controller, and thus simplifies the structure and reduces expense of the dynamic controller of the amplifier with no sacrifice in performance.

34 Claims, 2 Drawing Sheets

U.S. PATENT DOCUMENTS

| | | |
|---|---|---|
| 6,233,091 B1 | 5/2001 | Kosaka et al. |
| 6,246,514 B1 | 6/2001 | Bonnedal et al. |
| 6,256,141 B1 | 7/2001 | Kosaka |
| 6,259,553 B1 | 7/2001 | Kinoshita |
| 6,266,466 B1 | 7/2001 | Nabeyama et al. |
| 6,271,962 B1 | 8/2001 | Choi |
| 6,275,330 B1 | 8/2001 | Izumi |
| 6,275,331 B1 | 8/2001 | Jones et al. |
| 6,282,017 B1 | 8/2001 | Kinoshita |
| 6,288,836 B1 | 9/2001 | Kawasaki et al. |

OTHER PUBLICATIONS

Nobuaki Takahashi et al., "An Output Power Stabilized Erbium–Doped Fiber Amplifier with Automatic Gain Control," IEEE Journal of Selected Topics in Quantum Electronics, pp. 1019–1026, vol. 3, No. 4, Aug., 1997.

Stephen P. Chinn, "Simplified Modeling of Transients in Gain–Clamped Erbium–Doped Fiber Amplifiers," pp. 1095–1100, Journal of Lightwave Technology, vol. 16, No. 6, Jun., 1998.

Haruo Okamura, "Automatic Optical Loss Compensation with Erbium–Doped Fiber Amplifier," pp. 1110–1116, Journal of Lightwave Technology, vol. 10, No. 8, Aug., 1992.

A. A. M. Saleh et al., "Modeling of Gain in Erbium–Doped Fiber Amplifiers," pp. 714–717, IEEE Photonics Technology Letters, vol. 2, No. 10, Oct. 1990.

E. Desurvire, "Analysis of Transient Gain Saturation and Recovery in Erbium–Doped Fiber Amplifiers," pp. 196–199, IEEE Photonics Technology Letters, vol. 1, No. 8, Aug. 1989.

Dwight H. Richards, et al., "A Theoretical Investigation of Dynamic All–Optical Automatic Gain Control in Multichannel EDFA's and EDFA Cascades," pp. 1027–1036, IEEE Journal of Selected Topics in Quantum Electronics, vol. 3, No. 4, Aug. 1997.

H. Suzuki et al., "Power Excursion Suppression in Cascades of Optical Amplifiers with Automatic Maximum Level Control," pp. 1051–1053, IEEE Photonics Technology Letters, vol. 11, No. 8, Aug., 1999.

Naoki Suzuki, et al., "Optical Fiber Amplifiers Employing Novel High–Speed AGC and Tone–Signal ALC Functions for WDM Transmission Systems," Information Technology R & D Center, Mitsubishi Electric Corporation.

Yuxing Zhao, et al., "Gain Clamped Erbium–Doped Fiber Amplifiers—Modeling and Experiment," pp. 1008–1012, IEEE Journal of Selected Topics in Quantum Electronics, vol. 3, No. 4, Aug. 1997.

Y. Sun, et al., "Average Inversion Level, Modeling, and Physics of Erbium–Doped Fiber Amplifiers," pp. 991–1007, IEEE Journal of Selected Topics in Quantum Electronics, vol. 3, No. 4, Aug., 1997.

A. Yu, et al., "Design and Modeling of Laser–Controlled Erbium–Doped Fiber Amplifiers," pp. 1013–1018, IEEE Journal of Selected Topics in Quantum Electronics, vol. 3, No. 4, Aug., 1997.

L. Tancevski, et al., "Gain Control in EDFA's by Pump Compensation," IEEE Photonics Technology Letters, pp. 1313–1315, vol. 10, No. 9, Sep., 1998.

E. Desurvire, et al., "Dynamic Gain Compensation in Saturated Erbium–Doped Fiber Amplifiers," IEEE Photonics Technology Letters, pp. 453–455, vol. 3, No. 5, May, 1991.

K. Motoshima, et al., "Dynamic Compensation of Transient Gain Saturation in Erbium–Doped Fiber Amplifiers by Pump Feedback Control," IEEE Photonics Technology Letters, pp. 1423–1426, vol. 5, No. 12, Dec., 1993.

H. Suzuki, et al., "Dynamic Gain Control by Maximum Signal Power Channel in Optical Linear Repeaters for WDM Photonic Transport Networks," IEEE Photonics Technology Letters, pp. 734–736, vol. 10, No. 5, May, 1998.

Seo Yeon, et al., "Dynamic Gain and Output Power Control in a Gain–Flattened Erbium–Doped Fiber Amplifier," IEEE Photonics Technology Letters, pp. 787–789, vol. 10, No. 6, Jun. 1998.

A.K. Srivastava, et al., "Fast–Link Control Protection of Surviving Channels in Multiwavelength Optical Networks," IEEE Photonics Technology Letters, pp. 1667–1669, vol. 9, No. 12, Dec., 1997.

Hosung Yoon, et al., "Reference Level Free Multichannel Gain Equalization and Transient Gain Suppression of EDFA with Differential ASE Power Monitoring," IEEE Photonics Technology Letters, pp. 316–318, vol. 11, No. 3, Mar., 1999.

* cited by examiner

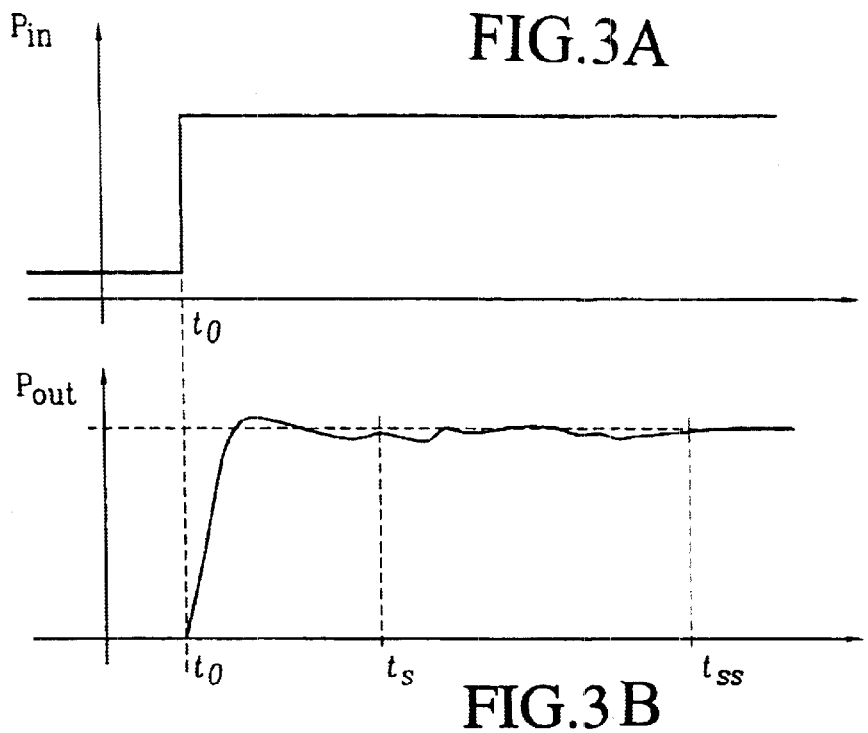
FIG.3A
FIG.3B
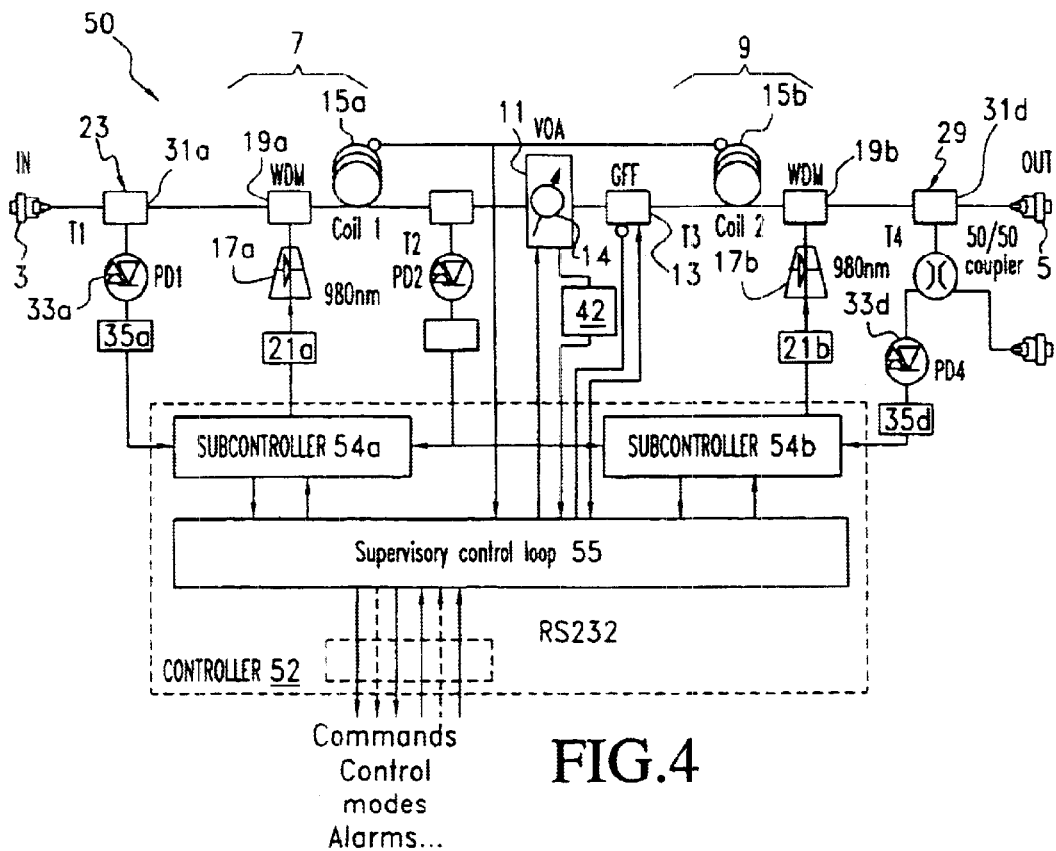
FIG.4

VARIABLE GAIN OPTICAL AMPLIFIER AND CONTROL METHOD

CROSS REFERENCE TO RELATED APPLICATIONS

This application is a continuation-in-part of application Ser. No. 09/860,021, filed May 17, 2001, entitled "Optical Amplifier Performance Controller and Method of Use."

FIELD OF THE INVENTION

This invention generally relates to optical amplifiers and is specifically concerned with a simpler and less expensive control system and method that requires fewer signal monitoring components.

BACKGROUND OF THE INVENTION

Erbium doped fiber amplifiers (EDFAs) are used in optical transmission networks to extend transmission distances and to compensate for losses from various network elements. Such amplifiers typically comprise a pair of pump lasers whose outputs are optically coupled to the inputs of two, serially connected coils of erbium-doped optical fiber. In operation, the outputs of the pump lasers excites the atoms of erbium dopant within the serially connected coils of fiber. These excited atoms release their excess energy in proportion to the strength of the incoming optical signal, which results in an amplified output.

When such EDFAs are used simply as amplification relay stations along a single, long-distance optical circuit, there is little need for a capacity to specifically control the amount of gain that the amplifier imparts on the incoming optical signal, as there is typically little change in the strength of the incoming signal. However, as optical systems have become more complex, the need for such a gain controller in the amplifier has increased. Such a need may arise, for example, when an optical network is installed around an urban area. Under such circumstances, the distances between the optical amplifiers may be very different, If the EDFAs in the system all have the same amplification capacity, this capacity must be adjusted by way of a gain control device so that the signal strength remains uniform throughout all branches of the network.

More recently, there has been a growing demand for optical gain controllers which are capable of maintaining a preselected gain setpoint despite rapid variations in the strength of the incoming signal. Such a control system is needed in optical networks transmitting dense wavelength division multiplexed signals (DWDM), wherein a plurality of different optical channels are being periodically added and dropped. Such a control system needs to maintain the selected gain setpoint over a broad dynamic range despite signal strength transients generated by the adding and dropping of channels. It further needs to uniformly amplify each channel, or to cause each channel to be uniformly amplified in the system by having a selectively tilted gain spectrum that compensates for under-amplified channels in the input. This requirement is referred to as gain flatness. Otherwise, such under-amplified channels may become lost at a point downstream in the network. Finally, the control system must have good transient characteristics. When additional channels are added or dropped, the total optical power may experience large upward or downward transient spikes that may last up to a millisecond. These spikes may cause a temporary increase in the bit-error-rate.

To meet this demand, an EDFA having a flat gain response with good transient characteristics was developed by Corning, Incorporated of Corning, N.Y. Such an optical amplifier is illustrated in FIG. 1, and disclosed and claimed in parent U.S. patent application Ser. No. 09/680,021, filed May 17, 2001. Such an amplifier generally comprises a pair of amplifier stages serially connected by a variable optical attenuator which operates to create the desired flatness or desired tilt in the output. As will be described in more detail hereinafter, the control system of such an amplifier operates by monitoring the strength of the optical signal both before and after each of the two coils of erbium-doped gain fiber. Each of the four monitoring circuits comprises an optical tap which diverts some of the light conducted through the amplifier to a photodiode, which in turn converts this light into an electrical signal. A transimpedance amplifier is connected to the output of the photodiode. The output of each of the four transimpedance amplifiers is conducted to the input of a digital signal processor, which proceeds to maintain a preselected gain setpoint by adjusting the amount of power conducted to each of the two pump light sources in response to the signals received from each of the four transimpedance amplifiers.

While the control system for the aforementioned amplifier is capable of dynamically maintaining a gain setpoint over a broad range and with a relatively flat output and good transient characteristics for the different channels being amplified, the inventors have noted some aspects of the design of this control system which might be improved. In particular, it would further be desirable if at least one of the monitoring circuits in the amplifier could be eliminated, as each such monitoring circuit requires relatively expensive, precision circuitry, and further weakens the gain capacity of the amplifier due to the necessary diversion of optical signal. It would be desirable if a dynamic controller for an optical amplifier could be developed which maintained all of the desirable response characteristics of the controller illustrated in FIG. 1, but which was simpler and less complicated in structure.

SUMMARY OF THE INVENTION

The invention is a variable gain optical amplifier that overcomes the aforementioned disadvantages of previously designed amplifiers. To this end, the optical amplifier of the invention comprises at least one amplifier stage having a light pump, and a power source for the pump; a variable optical attenuator connected to the amplifier stage and having a movable controller that changes attenuation of an amplifier output when moved to a different position, and a dynamic controller that maintains a selected gain setpoint for the amplifier. The dynamic controller includes gain detecting circuits that generate signals indicative of input signal and output signal strength of the amplifier stage, and a circuit that provides a signal indicative of a position of the attenuator controller. The dynamic controller further includes a signal processor connected to the gain detecting circuits and the position indicating circuit. The signal processor maintains a selected gain setpoint for the amplifier in accordance with signal input and output strengths of the amplifier stage, and a predetermined relationship between a position of the attenuator controller and signal attenuation.

The signal processor may be connected to the pump power source of the amplifier stage, and may maintain the selected gain setpoint by modulating power from the power source in response to signals from the gain detecting circuits and the position indicating circuit. The signal processor may also be connected to the attenuator controller and may maintain the selected gain setpoint by adjusting the movable attenuator controllers.

In a preferred embodiment of the invention, the signal processor maintains the selected gain setpoint by means of a look-up table correlating a selected gain setpoint with input and output signal strengths of the amplifier stage, and a position of the attenuator controller. Alternatively, the signal processor may operate by means of a preprogrammed formula or algorithm that correlates these parameters.

The variable gain optical amplifier may also include a second amplifier stage having an input that is connected to an output of the first stage via the variable optical attenuator. This second amplifier stage may also include a light pump and a power source therefor which is modulated by the digital signal processor. In such an embodiment, an additional gain detecting circuit is provided at the output of the second stage, and the signal processor maintains a preselected gain setpoint by means of a predetermined relationship between the outputs of the three gain detecting circuits and the position indicating circuit of the attenuator controller.

The invention also encompasses a method of controlling a variable gain optical amplifier of the type having an amplifier stage connected to a power source, and a variable optical attenuator having an input connected to an output of the amplifier stage and a movable controller that changes signal gain when moved. The method comprises the steps of monitoring the strength of an incoming signal transmitted to an input of the amplifier stage, monitoring the strength of an attenuated, amplified signal transmitted from an output of the variable optical attenuator in accordance with a predetermined relationship between a position of the movable controller and signal attenuation, and maintaining a predetermined gain setpoint by varying the amount of power conducted to the amplifier stage from the power source and/or varying the position of the movable controller of the optical attenuator in response to changes in the strength of the input and output signals.

The invention provides an optical amplifier having a dynamic controller capable of providing flat output gain over a broad range of gain with good transient characteristics by means of a simpler controller that replaces a gain detecting circuit with a relatively inexpensive circuit that provides a signal indicative of a position of a controller for a variable optical attenuator.

BRIEF DESCRIPTION OF THE DRAWING

FIGS. 3A and 3B illustrate the transient performance for the embodiment of the invention illustrated in FIG. 2 by comparing how a sudden increase in the power of the input signal affects the power of the output signal over time, and FIG. 4 is a schematic diagram of a second embodiment of the amplifier of the invention having a different controller architecture.

DETAILED DESCRIPTION OF THE INVENTION

Figure 1:
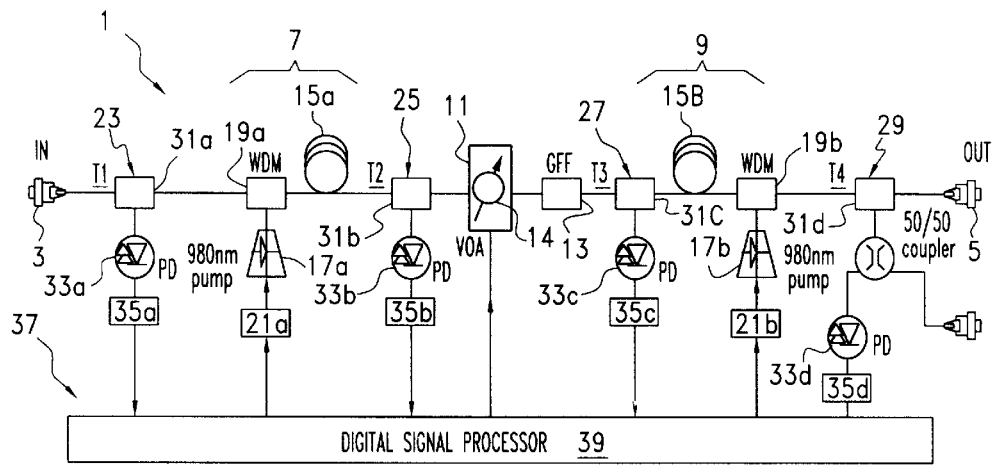
FIG. 1 is a schematic diagram of a variable gain optical amplifier that does not embody the invention.

The invention is an improvement of the optical amplifier 1 illustrated in FIG. 1. This amplifier includes an input 3 and an output 5 and a pair of amplifier stages 7 and 9 serially connected via a variable optical attenuator 11, and a gain flattening filter 13. The variable optical attenuator 11 includes a movable controller 14 which operates to increase or decrease the amount of attenuation, depending upon the position it is moved to. The s variable optical attenuator 11 and gain flattening filter 13 cooperate to provide a flat gain spectrum of the channels amplified by the amplifier 1.

Each of the amplifier stages 7 and 9 includes a coil 15a, b of erbium-doped gain fiber. Laser-powered light pumps 17a, b are optically coupled to input ends of the coils 15a, b via wave division multiplexers 19a, b. Each of the light pumps 17a, b is in turn powered by an electrical power source 21a, b. Gain detecting circuits 23, 25, 27, and 29 are provided to measure the strength of the signal at points T1, T2, T3, and T4 in the amplifier 1. Each of these gain detecting circuits includes an optical tap 31a-d that diverts a small percentage of the signal light from the amplifier to a photodiode 33a-d. Each of these gain detecting circuits includes a transimpedance amplifier 35a-d that converts the electrical signals produced by the photodiodes 33a-d from the light they receive into a signal indicative of the signal strength at the particular point T1, T2, T3, and T4 that the gain detecting circuit is coupled to.

The amplifier 1 further includes a dynamic controller 37 largely formed from a digital signal processor 39. The outputs of each of the transimpedance amplifiers 35a-d of the gain detecting circuits 23, 25, 27, and 29 are connected to an input of the processor 39. The output of the processor 39 is in turn connected to the electrical power sources 21a, b of the light pumps 17a, b of each of the amplifier stages 7,9. The dynamic controller 37 of the optical amplifier 1 may operate to control the output of the amplifier in three different modes, i.e., in accordance with a preselected gain setpoint Gspi in accordance with a preselected power setpoint Psp, or in accordance with a preselected current level for the pump lights 17a, b. However, the first mode of operation is the most preferred as it is the most useful for practical applications of the amplifier with an optical network.

The dynamic controller 37 maintains a selected gain setpoint Gsp by adjusting the amount of power conducted to the light pumps 17a, b and the position of the movable controller 14 of the variable optical attenuator 11 in accordance with the following method:

At time t:

Read the optical power at terminals T1, T2, T3, T4 via gain detecting circuits 23, 25, 27, and 29.

Check if the power in terminal T1 has changed from the last reading, in time instant t-1. If not, go to step 1.

Calculate the new gain setpoints for the first and second coils 15a, b from the following relations:

$$G_{1SP}(t)=T_2(t)-T_1(t)$$

in dB, or $$G_{2SP}(t)=T_4(t)-T_3(t)$$

$$G_{1SP}(t)=T_2(t)/T_1(t)$$

in linear scale $$G_{2SP}(t)=T_4(t)/T_3(t)$$

Finally, calculate the power levels P1 and P2 of the light pumps 17a, b and the position of the VOA necessary to achieve these new gain setpoints by means of the following equations 1-8:

Based on the total gain setpoint ($G_{sp}$) and the power measured at T1 (in dBm), one can compute the powers to be set at T2, T3, and T4 by controlling P1, P2, and VOA. T2 power depends on T1 only and should be set first by controlling P1.

$$T_2 = -0.0097(T_1)^2 - 0.0856T_1 - 0.4524 \quad (1)$$

Power at T3 is adjusted by controlling the VOA and is a complicated function of T1 and Gsp defined below:

$$T_3 = a(T_1)^2 + bT_1 + c \quad (2)$$

Where $$a = 0.0002(G_{sp})^2 - 0.0064G_{sp} + 0.0321 \quad (3)$$

$$b = +0.0004(G_{sp})^3 - 0.0114(G_{sp})^2 + 0.0329G_{sp} + 0.2753 \quad (4)$$

$$c = +0.0083(G_{sp})^3 - 0.3611(G_{sp})^2 = 5.3612G_{sp} - 45.097 \quad (5)$$

After T2 and T3 have been set, T4 is adjusted by controlled P2 only and is given by $$T_4 = mT_1 + n \quad (6)$$

where $$m = -0.0009(G_{sp})^2 + 0.0221G_{sp} + 0.8474 \quad (7)$$

$$n = 12.1381n(G_{sp}) - 23.342 \quad (8)$$

Figure 2:
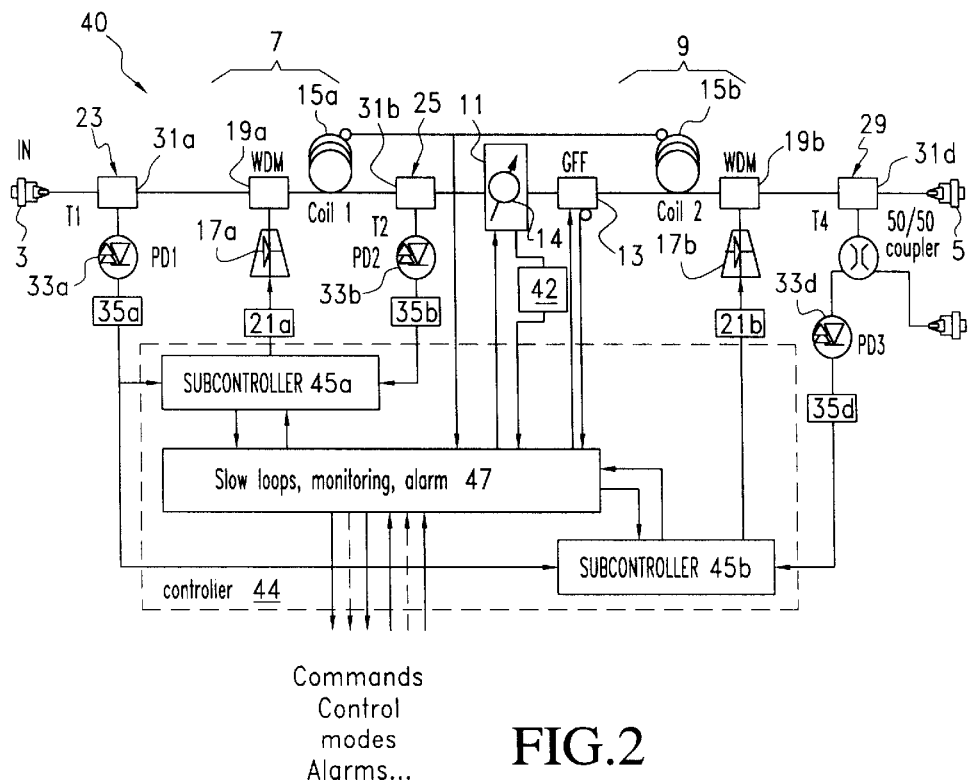
FIG. 2 is a schematic diagram of a first embodiment of the amplifier of the invention.

FIG. 2 illustrates a first embodiment 40 of the inventive amplifier, which is similar in structure to the optical amplifier of FIG. 1, with three important exceptions. First, gain detecting circuit 27 has been eliminated. Secondly, a position indicating circuit 42 has been added which transmits an electrical signal indicative of the position of the movable controller 14 of the variable optical attenuator 11. Thirdly, the dynamic controller 44 includes a pair of subcontrollers 45a, b connected to the first and second amplifier stages 7 and 9, respectively. Coordination of the subcontrollers 45a, b is accomplished through central loop 47.

The movable controller 14 of such variable optical attenuator 11 is typically rotated in one direction or the other to vary the attenuation of the signal received by the attenuator. Such rotation is usually implemented by means of a stepper motor. The position indicating circuit 14 may simply be a potentiometer having a shaft connected to the rotary output of such a stepper motor. The resistance R of the potentiometer can be correlated to the attenuation of the variable optical attenuator 11 in the form of a look-up table or empirical formula and that information can be programmed into the memory of the processor of the dynamic controller 44 to calculate the optical signal attenuation between points T2 and T3. Such a relationship between resistance and attenuation can generally be described by the following equation:

$$T_3 = f(R)$$

Alternatively, the position indicating circuit 42 may be an encoder attached to the shaft (not shown) of the movable controller 14 in combination with a simple processor that converts signals received from the encoder into an angular position of the controller 14. The processor of the controller 44 may in turn be programmed to correlate such angular position signals into a particular optical signal attenuation such that $T_3$ may be computed. The foregoing are only exemplary of the many forms that the position indicating circuit 42 may take, and all such forms are intended to be encompassed within the scope of the claimed invention.

With reference now to FIGS. 3A and 3B, the first embodiment 40 of the inventive amplifier may be operated in accordance with the following method to maintain preselected gain setpoint Gsp when the position indicating circuit 14 is a potentiometer:

1. At time t detect the optical signal powers at T1, T2, T4 and calculate T3 from the value of the potentiometer resistance R from an empirically predetermined relationship between R and signal attenuator.
2. Check if the power in terminal T1 has changed from the last reading, in time instant t-1. If not, go to step 1.
3. Calculate the new gain setpoint for coil 1 from equation (1) and the following equations:

$$G_{1SP}(t) = T_2(t) - T_1(t) \text{ in dB, or}$$

$$G_{1SP}(t) = T_2(t)/T_1(t) \text{ in linear scale}$$

4. Apply one of a number of known prior art control laws (for instance proportional plus integral—P1) for loop 1 in controller 44 such that the gain of the first coil is equal to $G_{1SP}$.

5. Apply the same or a similar control law for loop 2 of controller 44, such that the overall gain of the amplifier 40 is equal to $G_{SP}$. After the settling time $t_S$ the total gain $G(t_S)$ (or output power) will be equal to its setpoint value $G_{SP}$, as shown in FIG. 3. However, the VOA has not changed its attentuation from the value at time $t_0$. This means that the gain tilt may be present at time t.

6. Calculate the values of VOA attenuation $G_{VOA_{13}}$ $SP(t_S)$ needed to bring the gain tilt to zero. Use equations (1)-(8) and $$G_{VOA\_SP}(t_S) = T_3(t_S) \text{ in dB}$$

$$G_{VOA\_SP}(t_S) = T_3(t_S)/T_2(t_S) \text{ in linear scale}$$

7. Employ a known prior art control law to bring the VOA attenuation to its setpoint value. The transient response will reach its steady state at time $t_{SS}$, shown in FIG. 3, when the tilt of the amplifier will be reduced, theoretically, to zero, provided an ideal gain flattening filter (GFF) is used.

FIG. 4 illustrates a second embodiment 50 of the inventive amplifier. This embodiment is identical in structure to the first embodiment 40, with the exception that the architecture of its dynamic controller 52 is different. Specifically, controller 52 includes first and second subcontrollers 54a, b connected in series, as opposed to the cascade arrangement of subcontrollers 45a, b in embodiment 40. Moreover, subcontroller 54 receives input information from T2 and not from T3. The operation of the two subcontrollers 54a, b is coordinated by means of supervisory control loop 55. The tuning of transient performance is easier for the second embodiment 50 than for the first embodiment 40 due to the fact that subcontrollers 54a, b are decoupled or independent of each other in this particular architecture. However, the response time is somewhat shorter in the cascade-type architecture of embodiment 40 since the second subcontroller 45b more directly controls the gain generated by the amplifier 40 from information received simultaneously from T1 and T4 via direct connections to gain detecting circuits 23 and 29. In embodiment 50, the total gain of the amplifier is equal to:

$$G = T_4/T_1 = (T_4/T_2)(T_2/T_1) = G_1 G_2$$

$$G_1 = T_2/T_1, G_2 = T_4/T_2$$

From the above formula it is clear that the total amplifier gain, G, will be controlled by the supervisory control loop 55. This loop will set G1 and G2 such that their product is equal to the required total gain.

While this invention has been described with respect to two embodiments, various modifications, additions, and variations will become evident to persons of skill in the art. For example, the disclosed controller and method may be applied to amplifiers having more than two stages, and even to Raman fiber amplifiers (RFA).

PARTS LIST

1. Prior designed optical amplifier
3. Input
5. Output
7. Amplifier stage
9. Amplifier stage
11. Variable optical attenuator
13. Gain flattening filter
14. Movable controller
15. Coils a, b
17. Light pumps a, b
19. Wave division multiplexer
21. Power sources a, b
23. Gain detecting circuit
25. Gain detecting circuit
27. Gain detecting circuit
29. Gain detecting circuit
31. Optical tap a-d
33. Photodiode a-d
35. Transimpedance amplifier a-d
37. Dynamic controller
39. Digital signal processor
40. First embodiment of inventive amplifier
42. Position indicating circuit
44. Controller
45. Sub-controllers a, b
47. Supervisory control llp
50. Second embodiment
52. Controller
54. Subcontrollers a, b
55. Supervisory control loop

What is claimed is:

1. A variable gain optical amplifier, comprising:
an amplifier stage;
a variable optical attenuator connected to said amplifier stage and having a movable controller that changes an attenuation of an amplifier output when moved to a different position; and
a dynamic controller that generates signals indicative of input signal and output signal strength of said amplifier stage;
including gain detecting circuits and a position indicating circuit that provides a signal indicative of a position of the attenuator controller, and
a signal processor connected to said gain detecting circuits that maintains a selected gain setpoint for said amplifier in accordance with said signal input and output strengths and a predetermined relationship between a position of said attenuator controller and signal attenuation.

2. The variable gain optical amplifier described in claim 1, wherein said signal processor is connected to said pump power source of said amplifier stage, and maintains said selected gain setpoint by modulating power from said power source in response to signals from said gain detecting circuits and the position indicating circuit.

3. The variable gain optical amplifier described in claim 1, wherein said signal processor is connected to said attenuator controller, and maintains said selected gain setpoint by adjusting said movable attenuator controller in response to signals received from said gain detecting circuit.

4. The variable gain optical amplifier described in claim 1, wherein said signal processor maintains said selected gain setpoint by means of a preprogrammed formula that correlates a selected gain setpoint with an incoming signal strength, a gain level of said amplifier stage, and a position of said attenuator controller.

5. The variable gain optical amplifier described in claim 1, wherein said signal processor includes a look-up table correlating a selected gain setpoint with input and output signal strengths of said amplifier stage, and a position of said attenuator controller.

6. The variable gain optical amplifier described in claim 1, wherein said amplifier stage includes a length of gain fiber and a source of laser pump light.

7. The variable gain optical amplifier described in claim 6, wherein said gain fiber includes a dopant.

8. The variable gain optical amplifier described in claim 7, wherein said dopant includes a rare earth metal.

9. The variable gain optical amplifier described in claim 2, further comprising a second amplifier stage having an input that is connected to an output of said first stage via said variable optical attenuator, said second amplifier stage having a light pump, and a power source for said pump.

10. The variable gain optical amplifier described in claim 9, wherein said gain detecting circuit includes first and second circuits for sensing signal strength at an input and the output of said first stage, respectively, and a third circuit for sensing an output of said second stage.

11. The variable gain optical amplifier described in claim 10, wherein said signal processor computes an optical signal strength at a point between said attenuator and the input of said second stage from said signal received from said position indicating circuit.

12. The variable gain optical amplifier described in claim 9, further comprising a gain flattening filter coupled between said variable optical attenuator and said second stage input.

13. The variable gain optical amplifier described in claim 10, wherein said first, second, and third circuits of said gain detecting circuit each include optical tap for diverting light from said amplifier to a photodiode that converts said light into an electrical signal.

14. The variable gain optical amplifier described in claim 9, wherein said signal processor is connected to said pump power source of said second amplifier stage and maintains said selected setpoint by modulating power from said second stage power source in response to signals received from said gain detecting circuit.

15. A variable gain optical amplifier, comprising:
first and second amplifier stages, each of which includes an input and an output, a light pump, and a power source for said pump;
a variable optical attenuator connected between the output of said first amplifier stage and the input of the second amplifier stage and having a movable controller that changes an attenuation in optical output when moved to a different position, and
a dynamic controller including:
first and second gain detecting circuits that generate signals indicative of signal gain for said first and second amplifier stages, respectively;
a controller position indicating circuit that provides a signal indicative of a position of the attenuator controller, and
a signal processor connected to said gain detecting and position indicating circuits that maintains a selected gain setpoint for said amplifier in accordance with outputs of said gain detecting circuits and a predetermined relationship between a position of said attenuator controller and signal attenuation.

16. The variable gain optical amplifier described in claim 15, wherein said signal processor is connected to at least one of said pump power sources of said amplifier stages, and maintains said selected gain setpoint by modulating power from either or both of said power sources in response to signals from said gain detecting circuit.

17. The variable gain optical amplifier described in claim 15, wherein said signal processor is connected to said movable attenuator controller, and maintains said selected gain setpoint by adjusting said movable attenuator controller in response to signals received from said gain detecting circuits and position indicating circuit.

18. The variable gain optical amplifier described in claim 15, wherein said signal processor maintains said selected gain setpoint by means of a preprogrammed formula that correlates a selected gain setpoint with an incoming signal strength, gain levels of said first and second amplifier stages, and a position of said attenuator controller.

19. The variable gain optical amplifier described in claim 15, wherein said signal processor includes a look-up table correlating a selected gain setpoint, gain levels sensed by said first and second gain detecting circuits, and a position of said attenuator controller.

20. The variable gain optical amplifier described in claim 15, wherein said position indication circuit includes a potentiometer.

21. The variable gain optical amplifier described in claim 15, wherein said position indication circuit includes a stepper motor.

22. The variable gain optical amplifier described in claim 15, wherein each amplifier stage includes a length of erbium doped gain fiber, a source of pump light connected to said fiber, and a variable power source connected to said pump light source, wherein said signal processor controls an amount of power transmitted to said pump light via said power source in response to a selected amplifier setpoint.

23. The variable gain optical amplifier described in claim 15, wherein said signal processor computes an optical signal strength at a point between said attenuator and the input of said second stage from said signal received from said position indicating circuit.

24. The variable gain optical amplifier described in claim 15, further comprising a gain flattening filter coupled between said variable optical attenuator and said second stage input.

25. The variable gain optical amplifier described in claim 15, wherein each of said gain detecting circuits includes an optical tap for diverting light from said amplifier to a photodiode that converts said light into an electrical signal.

26. The variable gain optical amplifier described in claim 25, wherein said first gain detecting circuit includes an optical tap and photodiode coupled to the input and output of said first amplifier stage, and said second gain detecting circuit includes said position indicating circuit, and an optical tap and photodiode coupled to the output of the second amplifier stage.

27. The variable gain optical amplifier described in claim 26, wherein said second gain detecting circuit is connected to the output of the optical tap and photodiode connected to the input of the first amplifier stage.

28. The variable gain optical amplifier described in claim 26, wherein said second gain connecting circuit is connected to the output of the optical tap and photodiode connected to the output of the first amplifier stage.

29. A method of controlling a variable gain optical amplifier of the type having an amplifier stage connected to a power source, and a variable optical attenuator having an input connected to an output of the amplifier stage and a movable controller that changes a signal gain when moved, comprising the steps of:

monitoring the strength of an incoming signal transmitted to an input of said amplifier stage;

monitoring the strength of an attenuated, amplified signal transmitted from an output of the variable optical attenuator in accordance with a predetermined relationship between a position of said movable controller and signal attenuation, and maintaining a predetermined gain setpoint by varying the amount of power conducted to the amplifier stage from said source and/or varying the position of the movable controller in response to changes in the strength of said input and output signals.

30. The method of controlling a variable gain optical amplifier as described in claim 29, further including the step of monitoring the strength of an amplified signal transmitted from an output of said amplifier stage.

31. The method of controlling a variable gain optical amplifier as described in claim 29, wherein said amplifier includes a second amplifier stage connected to a power source, and having an input connected to the output of the variable optical attenuator, and wherein said predetermined gain setpoint is maintained by varying the amount of power conducted to the second amplifier stage.

32. The method of controlling a variable gain optical amplifier as described in claim 31, further comprising the step of monitoring the strength of an amplified signal transmitted from an output of the second amplifier stage.

33. The method of controlling a variable gain optical amplifier as described in claim 29, further comprising the step of converting said predetermined relationship into a look-up table.

34. The method of controlling a variable gain optical amplifier as described in claim 29, further comprising the step of converting said predetermined relationship into a formula.

* * * * *